UNITED STATES PATENT OFFICE.

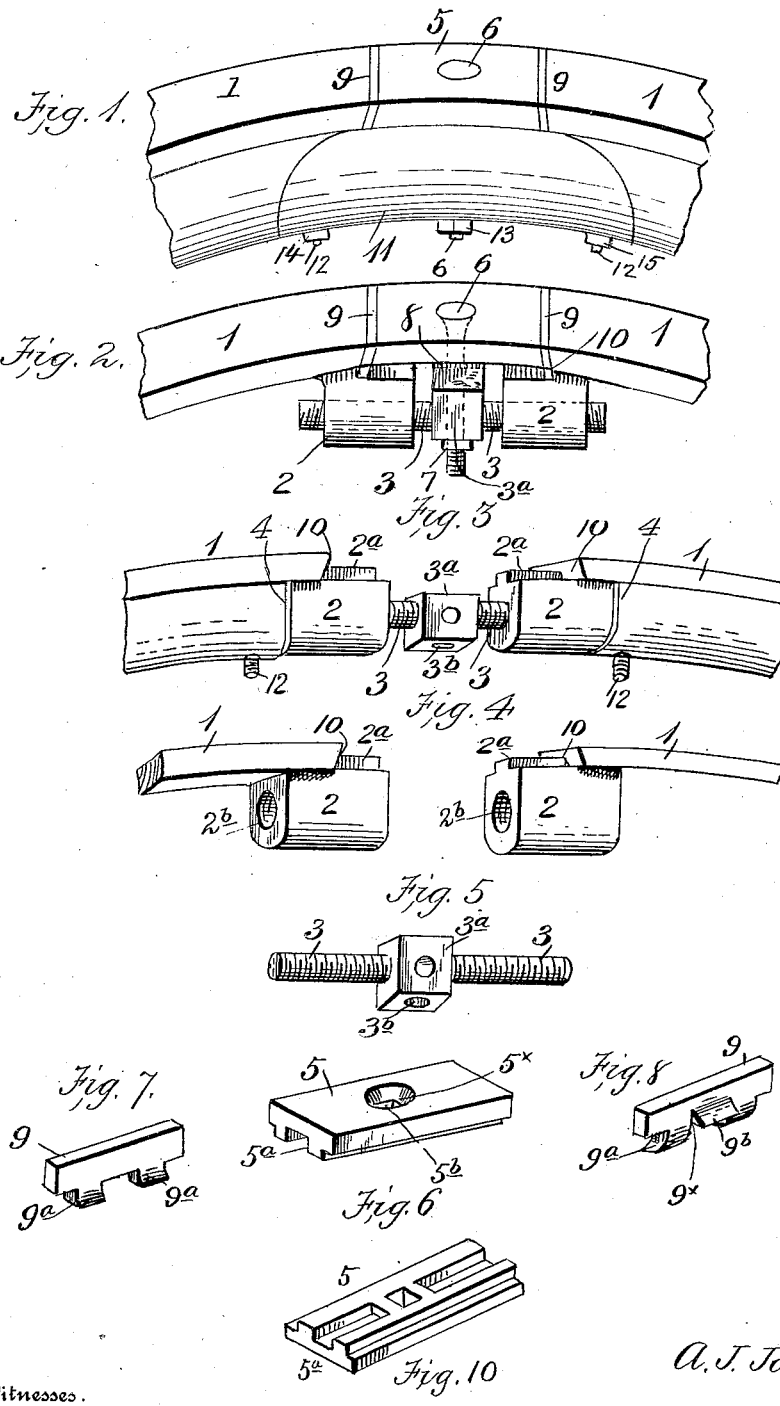

ADONIRAM JUDSON JAMES, OF HOUSTON, TEXAS.

WHEEL-TIRE.

No. 863,539.  Specification of Letters Patent.  Patented Aug. 13, 1907.

Application filed December 26, 1905. Serial No. 293,303.

*To all whom it may concern:*

Be it known that I, ADONIRAM JUDSON JAMES, a citizen of the United States, residing at Houston, in the county of Harris and State of Texas, have invented new and useful Improvements in Wheel-Tires, of which the following is a specification.

My invention relates to improvements in wheel tires.

It has for its object to provide for tightening the tire when required and to effect the same in a simple, economic and expeditious manner, and to these ends the invention consists of certain structural features substantially as hereinafter fully disclosed and particularly pointed out by the claims.

In the accompanying drawing illustrating the preferred embodiment of my invention—Figure 1 is a broken-away perspective view of certain parts of a wheel embracing said invention. Fig. 2 is a like view of the same, with the felly and the housing or clip, covering the tightener proper, removed. Fig. 3 is a like view thereof, with still other parts displaced. Fig. 4 is also a like view of the same, with still further parts omitted. Fig. 5 is a detached perspective view of the right-handed and left-handed screw. Fig. 6 is a like view of an adjunctive part or tire-splicing member or bridge-piece. Figs. 7 and 8 are detailed perspective views of wedging pieces or members interposed between the ends of the tire and the splicing member or bridge-piece. Fig. 9 is an end elevation of said wedge. Fig. 10 is an inverted perspective view of the bridge-plate.

In the embodiment of my invention, I equip or provide the tire 1 with lugs 2 depending therefrom, a short distance inward of its ends, and extending a like distance beyond, and just in a line with the lower or inner edges of said ends as shown. Said lugs are formed or provided upon their outer or upper surfaces with central longitudinal ribs or projections $2^a$ practically in continuation of the tire to the extent of the length of the projecting portions of said lugs.

A right-handed and left-handed screw 3, with a central, preferably angular, fixed or integral member or enlargement $3^a$, is effective to engage correspondingly threaded passages or sockets $2^b$ produced within the lugs 2 and extending clear through the latter, permitting said screw to bear or impinge at its ends upon wearing or bearing plates 4 interposed between the lugs 2 and the opposed or adjacent felly-sections of the wheel. Said enlargement or member $3^a$ has extending vertically therethrough an unthreaded opening or passage $3^b$; and superposed relatively to said part or member is a tire-splicing member or bridge-piece 5. Said splicing member or bridge-piece has a central longitudinal groove $5^a$ in its underside to receive the ribs or projections $2^a$ of the lugs 2 to prevent lateral displacement of said bridge-piece.

A bolt 6 is inserted through the vertical opening or passage $3^b$, of the angular enlargement or member $3^a$ of the screw 3 and through a corresponding and registering opening $5^x$ of the splicing member or bridge-piece 5; being passed from the upper or outer side of the latter; and which member is provided with a countersink $5^b$ to isolate or sink the head of said bolt within the plane of said bridge-piece, for obvious reasons. Said bolt has screwed, upon its threaded or inner end, a nut 7 turned firmly up against the part $3^a$ for effectively securing said bolt in position.

A rubber or elastic cushion or packing 8 may be, and is interposed or wedged between the member $3^a$ of the screw 3 and the underside of the bridge-piece 5 for strengthening the parts and deadening noise or vibrations.

A number of wedging pieces or "riders" 9 are inserted between the ends of the bridge-piece or member 5 and the tire-ends, for initially filling out the same at those points as is apparent. It will be noted that, as conditions require, as in tightening the tire or bringing its ends nearer together, a wedging piece or rider is removed or displaced or a number thereof removed or displaced, as necessary. All of these pieces or riders are counterparts one of the other, and each is deflected laterally at its inner or bottom edge as at $9^a$ and has formed therewith, about centrally of the same edge, an oppositely deflected tongue $9^b$. It will therefore be observed that, when these "riders" or pieces are in place as shown, the deflected portions or flanges $9^a$ will, in the case of those next to the ends of the tire, take into recesses 10 formed in said ends, and that the corresponding portions of successive pieces will nest one within the other, while successive tongues $9^b$ will fit or take into preceding notches $9^x$ resulting from the formation of such tongues, said pieces being disposed with the latter pointing or projecting in the same direction. Thus, by this construction and arrangement of parts, the "riders" or pieces noted are held as against outward or radial displacement.

Over all, exclusive of the bridge-piece 5 and the riders 9, is applied a metal clip or housing 11 projecting central bolt-end 6 and lateral bolt-ends 12, 12 extending through said clip or housing and having applied thereto nuts 13, 14, 15, respectively, outside of said clip, for the retention of said clip in place and the nut 7 upon its bolt.

It will be noted that the bridge-piece or splicing tire-member may be removed by withdrawing the bolt securing the same to the fixed member of the right-handed and left-handed screw, and the latter thus be permitted to be readily manipulated as in tightening the wheel, and said bridge-piece then be again as readily replaced.

I claim:

1. A device of the character described, comprising a bridge-piece forming a tire-splicing-member and having a longitudinal groove in its underside; inward-extending lugs projecting from the tire and having ribs entering said groove, series of removable "riders" adapted for insertion between said bridge-piece and tire-ends, tightening means between said lugs, and securing means between said bridge-piece and said lug-tightening means.

2. A device of the character described, comprising a bridge-piece forming a tire-splicing member, inward-extending lugs projecting from the tire, series of filling-in pieces adapted for insertion between the tire-ends and said bridge-piece, and having laterally deflected portions, at their bottom edges, and, centrally of these, oppositely deflected tongues, said laterally deflected portions being effective for resting one within the other and said tongues for taking into the notches of successive filling-in pieces, said notches resulting from the formation of said tongues in said pieces, tightening means between said lugs, and securing means between said bridge-piece and said lug-tightening means.

3. A device of the character described, comprising a tire, with its end-portions provided with inward extended lugs equipped, upon their upper surfaces, with longitudinal ribs, said end-portions also having, at their bases, recesses, a tightening screw engaging said lugs, a bridge-piece effective for retention upon said lugs, filling-in pieces having laterally deflected portions for resting one within the other and for engagement with said recesses, and tongues, in like manner, fitting one within the other; a bridge-piece having an underside groove receiving said projections, and a securing bolt effecting connection between said bridge-piece and tightening screw.

In testimony whereof I affix my signature, in presence of two subscribing witnesses.

ADONIRAM JUDSON JAMES.

Witnesses:
F. F. CHEW, Sr.,
E. T. CHEW.